United States Patent [19]

d'Autry

[11] E Patent Number: Re. 32,210

[45] Reissued Date of Patent: Jul. 22, 1986

[54] DEVICE FOR EJECTING THE REMOVABLE TIP OF A PIPETTE

[76] Inventor: Eric J. H. d'Autry, 69,72, rue Gambetta Boite Postale 45, 95400 Villiers-Le-Bel, France

[21] Appl. No.: 882,279

[22] Filed: Feb. 28, 1978

Related U.S. Patent Documents

Reissue of:

[64] Patent No.: 3,991,617
Issued: Nov. 16, 1976
Appl. No.: 622,317
Filed: Oct. 14, 1975

[30] Foreign Application Priority Data

Oct. 15, 1974 [FR] France ..... 74 34588

[51] Int. Cl.[4] ..... B01L 3/02
[52] U.S. Cl. ..... 73/864.14
[58] Field of Search ..... 73/425.4 P, 425.6, 864.14; 374/158

[56] References Cited

U.S. PATENT DOCUMENTS

| | | | |
|---|---|---|---|
| Re. 27,637 | 5/1973 | Roach | 73/425.6 |
| 3,766,785 | 10/1973 | Smernoff | 73/425.6 |
| 3,786,683 | 1/1974 | Berman et al. | 73/425.4 P |
| 3,827,305 | 8/1974 | Gilson | 73/425.6 |
| 3,853,012 | 12/1974 | Scordato et al. | 73/425.6 |
| 3,882,729 | 5/1975 | Roach | 73/425.6 |
| 3,905,232 | 9/1975 | Knute | 73/362 AR |
| 3,918,308 | 11/1975 | Reed | 73/425.6 |
| 4,009,611 | 3/1977 | Koffer et al. | 73/425.6 |

OTHER PUBLICATIONS

Model Q Micropipetting Systems, Oxford Laboratories, 1974.

*Primary Examiner*—Charles A. Ruehl
*Attorney, Agent, or Firm*—Mason, Kolehmainen, Rathburn & Wyss

[57] ABSTRACT

A pipette intended to be used with ejectable tips push fitted onto the pipette which is also provided with a tip ejecting device. The device comprises a thumb actuable push button which on depression, against upward spring pressure, pushes down a rod. In turn the rod pushes down a limb attached to the rod. The limb is cranked to conform to the shape of the pipette and has a lower end formed as a sleeve normally surrounding the lower end of the pipette just above the ejectable tip so that downward movement of the sleeve pushes the tip off. The limb is detachable from the rod, and the sleeve can be slipped off the end of the pipette so that the limb may be washed.

12 Claims, 1 Drawing Figure

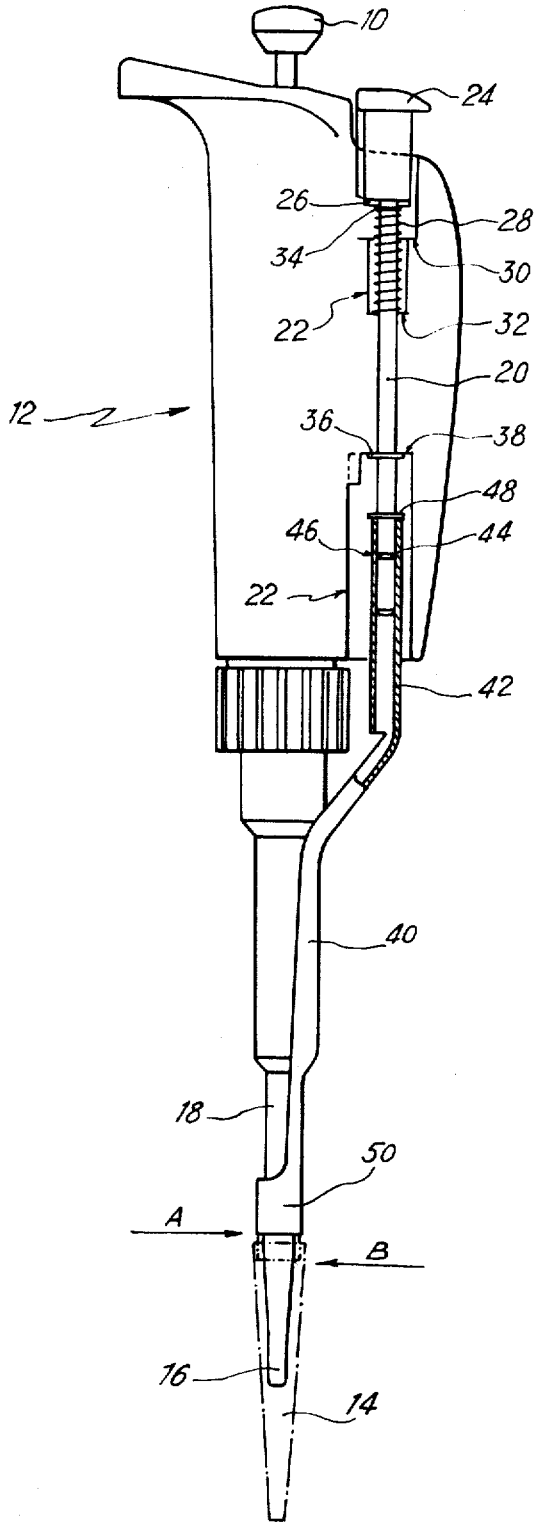
10
24
26
28
34
30
22
32
20
12
36
38
48
46
44
22
42
40
18
50
A
B
16
14

DEVICE FOR EJECTING THE REMOVABLE TIP OF A PIPETTE

Matter enclosed in heavy brackets [ ] appears in the original patent but forms no part of this reissue specification; matter printed in italics indicates the additions made by reissue.

The present invention relates to a device for ejecting the removable tip of a pipette. It is usual to provide the lower tubular end of pipettes, in particular precision micro-pipettes, with a removable tip made from a non-wetting material and preferably of conical shape. Tips of this type generally have an inner volume sufficient to contain the entire sample taken, thus preventing any contact of the liquid sample with the lower tubular part of the pipette. Any risk of contamination of the pipette proper is thus eliminated. After discharge of the sample taken, the removable tip is discarded then replaced by a new tip intended for the next sample. A pipette of this type, provided with a removable tip intended to be discarded after each use, is described in French Pat. No. 7,332,978 in particular.

Since pipettes of this type are intended for taking various samples, such as very active chemical products, pathological samples of serum or urine and possibly radio-active liquid materials, it is very desirable to equip pipettes of this type with a device for ejecting the tip, which makes it possible to eliminate any direct contact of the operator's hand with said tip.

Pipettes are already known whereof the entire body is surrounded externally by a sleeve, which is able to move along a certain longitudinal course and which is urged resiliently upwards by an appropriate spring member. In the inoperative position, the lower end of such a sleeve abuts against a shoulder provided on the pipette body. The lower part of said sleeve terminates in the vicinity of the upper limit reached by the detachable tip, when it is mounted by friction on the lower conical part of the pipette. Downwards movement of such a sleeve thus causes ejection of the removable tip. Such a device comprises several drawbacks: on the one hand, it is very difficult for the operator to handle it with one hand, on the other hand, such an ejection sleeve is permanently mounted on the pipette body and therefore cannot be changed for the purpose of decontaminating the latter for example.

Pipettes are also known, which are equipped with a ring mounted to rotate freely on the lower cylindrical part of the pipette, said ring comprising an inner cam of suitable shape. This cam is intended to co-operate with the upper end of an ejection sheath surrounding the lower part of the pipette. Said sheath, urged permanently upwards in a resilient manner, is able to be moved downwards subsequent to a rotation of the ring, which causes the ejection of the detachable tip. In practice, pipettes equipped with ejection devices of this type are not satisfactory for the two following reasons: firstly, the ejection sheath situated in the immediate vicinity of the detachable tip cannot be removed and therefore cannot be decontaminated, on the other hand, the ejection of the removable tips necessarily requires the operator to use both hands.

The present invention relates to a device for ejecting the removable cones of a pipette making it possible to obviate the afore-mentioned drawbacks.

The device for ejecting the removable tip of a pipette comprises, according to the present invention:

A rod incorporated in a passage provided in the upper part of the pipette body, said passage and said rod being arranged so as to be able to impart to the latter a movement of translation parallel to the axis of the pipette;

means allowing said rod to move along a certain course, limited in both directions;

a removable ejection member whose upper part is arranged to co-operate by fitting together with the lower part of said rod in order to be able to be integral with the latter, whilst preserving its detachable characteristic, whereof the central part follows the shape of the lower part of the pipette and whose lower end terminates in order to surround at least partly the lower tubular end of the pipette in the vicinity of its conical part intended to receive the removable tip by friction, said ejection member having a length such that, in its upper position, its lower end does not reach the upper limit of the detachable tip, when the latter is put in place by friction.

According to a preferred embodiment of the invention, the removable ejection member terminates in an upper tubular end in order to be able to be fitted on the lower corresponding part of said rod.

According to another feature of the invention, the lower end of the ejection member terminates in a sleeve surrounding the lower tubular end of the pipette, said sleeve simultaneously fulfilling the function of a push-rod for the tip and guide for the movement of the ejection member.

The invention will be described in more detail hereafter, with reference to a particular embodiment of the device according to the invention, given as a non-limiting example and illustrated in the accompanying drawing.

The pipette illustrated in the accompanying FIGURE comprises a push button 10 connected by a rod to a piston (not shown) located in the body 12 of the pipette. The push button 10 may be depressed subsequent to a force exerted by the operator's thumb, which causes the downwards movement of the piston of the pipette. When the push button 10 is released, the quantity of liquid to be sampled is sucked into the detachable tip 14, without there being any direct contact of the sample taken with the free end 16 of the lower tubular part 18 of the pipette. The sample taken may then be poured into another vessel by once more exerting force on the push button 10. The device for ejecting the removable tip 14 according to the invention thus makes it possible to eject said tip without there being any direct contact of the operator's hand.

The device according to the invention comprises a rod 20 which is incorporated in a passage 22 provided in the body 12 of the pipette, said passage 22 being parallel with the axis of the pipette and passing right through the body 12. At its upper end, the rod 20 comprises a push button 24 which may be actuated by the operator's thumb for the purpose of ejecting, the removable tip 14. The push button 24 may be connected to the rod by any means, known per se. In the vicinity of its upper end and below the push button 24, the rod 20 comprises a stop-ring 26. This stop-ring 26 simultaneously fulfils the function of an upper abutment for a coil spring 28 surrounding the rod 20 and a stop member limiting the downwards travel of the rod 20 by co-operating with a shoulder 30 provided in the passage 22 of the pipette body, the coil spring 28 bears at its lower end against a corresponding shoulder 32 and at its upper part against a washer 34. This arrangement of the upper part of the rod 20 permanently urges the latter resiliently upwards and thus makes it possible to move the rod 20 downwards by action on the push button 24. Furthermore, the rod 20 comprises a second stop-ring 36 which by co-operation with a corresponding shoulder 38 provided in the passage 22, is intended to limit the upwards travel of said rod 20.

Furthermore, the ejection device according to the invention comprises a removable ejection member 40 whereof the upper part terminates in a tubular end 42 in order to be able to fit on the corresponding [upper] *lower* part of the rod 20. In its lower part, the rod 20 comprises an annular groove intended to receive a keeper ring 44, the keeper ring 44 co-operating with a groove 46 provided on the inner surface of the tubular end 42 of the ejection member 40. Furthermore, in the vicinity of its lower end, the rod 20 is provided with a circlip 48 intended firstly to limit the depth of engagement of the tubular part 42 on the rod 20 and secondly, to bring the keeper ring 44 and corresponding groove 46 into perfect alignment.

It will be easily understood that in this position, the ejection member 40 is made integral with the rod 20 and it is solely when a certain downwards pulling force is exerted on the member 40 that it is possible to detach the ejection member 40. The fact of being able to replace or simply detach the ejection member 40 in a very simple manner has proved very advantageous in practice, since this allows washing or decontamination operations of said ejection member 40.

As it appears very clearly on the accompanying FIGURE, in the embodiment described, the part of the ejection member 40 which is in the open, follows the shape of the pipette strictly. According to the present invention, the lower end 50 of the ejection member 40 should terminate so as to surround at least partly the lower tubular end 18 of the pipette, in order to provide a sufficient abutment surface on the upper edge of the removable tip 14, to ensure its ejection. In the particular embodiment described, the end 50 has a shape of a sleeve completely surrounding the lower tubular end of the pipette. Similarly, the abutment surface on the tip is maximum. The total length of the ejection member 40 should be calculated precisely such that when this member is in its upper position, i.e. in the inoperative position, its lower end does not reach the upper limit able to be occupied by the removable tip 14, when the latter has been put in place by friction on the end 16 of the pipette. According to an advantageous embodiment of the present invention, the sleeve 50 closely surrounds the tubular part of the pipette and thus increases the radial encumbrance of the lower part of the pipette only slightly, which thus makes it possible to take samples from vessels having a very small opening.

In the accompanying FIGURE, the removable tip 14 shown in dot-dash line occupies the highest possible position, when it is put in position by friction on the end 16 of the pipette. A force exerted by the operator's thumb on the push button 24 produces compression of the coil spring 28 until the washer 34 bears against the shoulder 30. This causes a displacement of the rod 20 in a downwards direction and consequently of the ejection member 40 which is mainly guided on its travel by the sleeve 50 surrounding the tubular part 18 of the pipette.

In the accompanying FIGURE, the arrow A represents the upper position, i.e. the inoperative position of the ejection member 40. In this position, the lower end of the sleeve 50 is slightly distant from the upper part of the tip 14. The arrow B represents the lower limit occupied by the ejection member 40 when it occupies the lower position subsequent to pressure exerted on the push buton 24. On examining the accompanying drawing, it will be understood that when the ejection member 40 is about to occupy the lower position, it causes the ejection of the removable tip.

It should be noted that the operator who handles a pipette equipped with the ejection device according to the invention, may carry out all the sampling and ejection operations by one hand. In addition, a pipette equipped in this way may be used either by right-handed or left-handed persons.

According to a preferred embodiment of the invention, the ejection member 40 is produced by shaping from a metal sheet having an appropriate cut-out.

Naturally, the present invention is not limited to the particular emboidment described with reference to the accompanying FIGURE, but it is perfectly possible, without diverging from the framework of the invention, to imagine other variations of the various parts constituting the ejection device of the invention.

What is claimed is:

1. Device for ejecting the removable tip of a pipette, [the] *a* lower *tubular* end of which terminates in the form of a conical part intended to receive said removable tip by friction, in particular of a micro-pipette, [characterised] *characterized* by the fact it comprises in combination:

a rod which is incorporated in a passage provided in the body of the pipette, said passage and said rod being arranged so as to be able to impart to the latter a movement of translation parallel to the axis of the pipette;

means allowing said rod to move along a certain path limited in the upwards and downwards direction;

resilient means permanently urging said rod in an upwards direction;

a removable ejection member comprising an upper part, a central part and a lower end, said upper part being removably fitted together with the lower part of said rod in an abutment relationship, said central part being located in the vicinity of the pipette, and said lower end terminating in the form of guiding and ejection means in order to surround at least partly the lower tubular end of the pipette in the vicinity of its conical part, the lower end of said ejection member in its upper position not reaching the upper limit of the removable tip when the latter is put in position by friction,

*at its upper end, the rod comprises a push button which, when actuated, moves the ejection member downwards thus causing the ejection of the removable tip, the rod also comprises, in the vicinity of its upper end and below the push button, a stop-ring fulfilling the function of an upper abutment for said resilient means comprising a coil spring surrounding said rod, said spring bearing by its lower end against a shoulder provided in the passage of the pipette body.*

2. Device according to claim 1, *characterized* [characterised] by the fact that the removable ejection member terminates in the form of an upper tubular end in order to be able to fit together with the corresponding lower *cylindrical* part of said rod.

[3. Device according to claim 1, characterised by the fact that, at its upper end, the rod comprises a push button which, when actuated, moves the ejection member downwards thus causing the ejection of the removable tip.]

[4. Device according to claim 3, characterised by the fact that the rod comprises, in the vicinity of its upper end and below the push button, a stop-ring fulfilling the function of an upper abutment for a coil spring surrounding said rod, said spring bearing by its lower end against a shoulder provided in the passage of the pipette body.]

5. Device according to claim [4] *1*, [characterised] *characterized* by the fact that the rod *and movement allowing means* [comprises] *comprise* a [stop ring] *stop-ring* limiting the downwards travel of said rod by co-operation with a corresponding shoulder provided in said passage of the pipette body.

6. Device according to claim 5, [characterised] *characterized* by the fact that the stop-ring fulfilling the function of an upper abutment for said [coil] *resilient means comprising a coil* spring and the ring limiting the downwards travel of said rod are constituted by the same part.

7. Device according to claim 6, [characterised] *characterized* by the fact that said rod *and said movement allowing means* [comprises] *comprise* a stop-ring limiting its upwards travel by co-operation with [the] *a* corresponding shoulder.

8. Device according to claim 1, [characterised] *characterized* by the fact that in the vicinity of its lower end, said rod is provided with a circlip intended to limit the engagement depth of the ejection member on the lower part of the rod.

9. Device according to claim 1, [characterised] *characterized* by the fact that in the vicinity of its lower part, the rod comprises an annular groove intended to receive a keeper ring co-operating with an annular groove in the ejection member in order to connect these two parts.

10. Device according to claim 2, [characterised] *characterized* by the fact that the ejection member whose upper part and lower [part] *end* are respectively in the form of a hollow tube and sleeve, is formed from a metal sheet having an appropriate cut-out.

*11. A device for ejecting the removable tip of a pipette, a lower tubular end of which terminates in the form of a conical part intended to receive said removable tip by friction, in particular of a micro-pipette, characterized by the fact it comprises in combination:*

*a rod which is incorporated in a passage provided in the body of the pipette, said passage and said rod being arranged so as to be able to impart to the latter a movement of translation parallel to the axis of the pipette;*

*means allowing said rod to move along a certain path limited in the upwards and downwards direction;*

*resilient means permanently urging said rod in an upwards direction;*

*a removable ejection member comprising an upper part, a central part and a lower end, said upper part being removably coupled with the lower part of said rod, said central part being located in the vicinity of the pipette, and said lower end terminating in the form of guiding and ejection means in order to surround at least partly the lower tubular end of the pipette in the vicinity of its conical part, the lower end of said ejection member in its upper position not reaching the upper limit of the removable tip when the latter is put in position by friction, said rod includes a push button at the upper end of said rod and a stop-ring in the vicinity of the upper end of said rod and at the bottom of said button fulfilling the function of an upper abutment for said resilient means comprising a coil spring surrounding said rod, said spring bearing by its lower end against a shoulder provided in the passage of the pipette body.*

*12. The device according to claim 11 wherein said lower end of said removable ejection member completely surrounds the lower tubular end of said pipette and extends upward from said lower tubular end of said pipette at least a distance sufficient to strengthen said lower end of said removable ejection member to prevent bending upon engagement with said removable tip.*

*13. The device according to claim 11 wherein said upper part of said ejection member being removably connected to said rod at a location relative to said passage in said body of said pipette to allow access for removal.*

*14. The device according to claim 11 said movement allowing means further comprising a stop-ring secured to said rod and limiting upward travel of said rod by engagement with the body of said pipette.*

* * * * *